Patented Oct. 23, 1951

2,572,473

UNITED STATES PATENT OFFICE 2,572,473

METHOD OF PLANT PROPAGATION

William R. Grove, Laurel, Fla., assignor to Dewitt Eaton, Sarasota, Fla.

No Drawing. Application July 31, 1947, Serial No. 765,259

1 Claim. (Cl. 47—58)

My invention is directed to an improved method for use in connection with plant propagation and has for one of its objects to provide a method of plant propagation which eliminates the necessary regularly watering each individual plant and very materially reduces the labor necessary during the propagating process.

While my improved method is applicable to a wide variety of plants, for purposes of clarity, I shall describe my method in connection with the propagating of lychee trees. It must be distinctly understood, however, that this plant is mentioned specifically merely in an illustrative sense and not by way of limitation.

The lychee tree may be produced from seed, but requires about eight to ten years' growth before producing fruit, and the fruit may differ greatly from that of the parent tree. For that reason, an air-layering method has been developed variously known as marcottage, Chinese air-layering, gootee air-layering whereby young trees may be taken from branches of the parent tree, these young trees generally bearing within three to five years, and with fruit true to their parentage.

Although this method has been employed throughout the world for many years for propagating young trees, it involves considerable expense because of the necessity of individually watering each plant, and many potential young trees are lost because they are not regularly watered. The present invention is the result of my efforts to overcome this drawback.

Generally speaking, plant propagation by the method above referred to involves girdling or otherwise mutilating the branch of a mature tree, and then wrapping in moist soil or moist moss or other moist material. The rooting process, that is the forming of roots at the mutilated area consumes from six to ten weeks. During this period it is essential that the soil or moss be kept moist. This involves a great deal of time where operations are being carried out on a commercial scale. Even on a 10,000 scale it will be appreciated that a great deal of trouble and expense are involved in keeping the wrapping moist over a rooting period of from six to ten weeks.

In the practice of my improved method of propagation, the limb or branch which is to be used in making a new tree may be mutilated by scarifying or by removing the bark from a section about three quarters of an inch along the limb or branch. In removing the bark the cambium layer is completely removed also. Of course, if left alone the branch beyond the mutilated area would die.

Accordingly, wet soil, earth or moss or both, is wrapped about the mutilated area. I then wrap the wet material with a material which while permitting of the passage of respiratory gases will not permit the passage of moisture. This wrapping completely encloses the wet material, is securely tied in place, and as a result the rooting material remains moist without the necessity of adding water throughout the rooting period, which, as above pointed out, is from six to ten weeks.

At the end of the rooting period the branch is cut off and planted and a new plant developed. By reason of the wrapping I employ it is no longer necessary from time to time to water the plant at the area being treated, which as will be appreciated, effects a tremendous saving in time, trouble and expense and the loss of potential trees through failure to keep the rooting material moist throughout the propagating period.

The material employed for wrapping, in the practice of my invention, must, as above set out, be moisture impervious, viz., capable of retaining moisture; the material at the same time being gas pervious, viz., capable of permitting of the passage of respiratory gases so that the breathing function of the plant is not impaired. I have obtained good results with a product marketed by The Goodyear Tire and Rubber Company of Akron, Ohio, and referred to by it as "250 gauge P9 vitafilm." I have also obtained satisfactory results with a product sold by The Goodrich Company under the name "vinyl film."

Tests have shown the water transmission rate, carbon dioxide transmission rate, and oxygen transmission rate of The Goodrich Company's "vinyl film" to be as follows:

Water vapor 1.32 gms./100 sq. in./24 hours, at 88° F. and 50% relative humidity.

$CO_2$—115,000 c. c./100 sq. in./100 hours, at 77° F. and 1 atmosphere partial pressure differential.

$O_2$—62,300 c. c./100 sq. in./100 hours, at 77° F. and 1 atmosphere partial pressure differential.

These are synthetic materials in the form of a synthetic plastic containing, I believe, rubber hydrochloride as the principal base.

However, I do not wish my invention limited to these products, inasmuch as in the broad concept of my invention any substantially moisture-impervious, gas-pervious plastic material may be used as a wrapping, so long as it will retain the moisture in the wet material about the area being processed without impairing the breathing function of the plant.

What I claim is:

In plant propagation, the method which comprises mutilating an area of a branch of a living plant which is to be employed in developing a new plant, enclosing this area in moist rooting material, wrapping a film of plastic material about the moist rooting material, retaining the wrapping in place until the branch has developed roots at the mutilated area, and then severing the branch below the rooted area; the said plastic material being substantially moisture-impervious but pervious to $CO_2$ and $O_2$, thereby to retain the moisture in the rooting material without deleteriously impairing the passage of $O_2$ to and the passage of $CO_2$ from the plant, and sufficiently weather-resistant to resist deleterious deterioration until the said roots have developed at the mutilated area.

WILLIAM R. GROVE.

REFERENCES CITED

The following references are of record in the file of this patent:

UNITED STATES PATENTS

| Number | Name | Date |
|---|---|---|
| 1,655,731 | May | Jan. 10, 1928 |
| 1,892,157 | Maier | Dec. 27, 1932 |
| 1,994,962 | Rushfeldt | Mar. 19, 1935 |
| 2,100,029 | Gammeter | Nov. 23, 1937 |

FOREIGN PATENTS

| Number | Country | Date |
|---|---|---|
| V-1696 | Australia (Victoria State) | 1872 |

OTHER REFERENCES

Bailey, "Standard Cyclopedia of Horticulture," vol. 2 (1943) pp. 1831, 1891, 1892, 1893.

Modern Packing, vol. 17, No. 2, pp. 103 through 107, October 1943.